United States Patent [19]
Hull et al.

[11] Patent Number: 5,271,656
[45] Date of Patent: Dec. 21, 1993

[54] MULTI-POSITIONABLE, FLEXIBLE TAILGATE

[76] Inventors: Harold L. Hull, 401 Canyon Way #43, Sparks, Nev. 89434; Robert Renn, P.O. Box 453, Crystal Bay, Nev. 89402; Robert G. Irvine, 25 Mohawk Ave., Corte Madera, Calif. 94925; William G. Donovan, 4593 Harbor Ln., Rohnert Park, Calif. 94928

[21] Appl. No.: 965,445

[22] Filed: Oct. 23, 1992

[51] Int. Cl.⁵ .............................................. B62D 25/00
[52] U.S. Cl. ................................ 296/180.1; 296/50
[58] Field of Search ............................ 296/180.1, 50

[56] References Cited

U.S. PATENT DOCUMENTS

| | | | |
|---|---|---|---|
| 4,585,265 | 4/1986 | Mader | 296/1 S |
| 4,763,944 | 8/1988 | Fry | 296/50 |
| 4,861,088 | 8/1989 | Fedrigo | 296/57.1 |
| 4,930,834 | 6/1990 | Moore | 296/50 |
| 4,932,705 | 6/1990 | Miller | 296/50 |
| 5,110,172 | 5/1992 | Ney | 296/50 |

*Primary Examiner*—Robert R. Song

[57] ABSTRACT

A tailgate barrier for a pickup truck bed which can be removably located at multiple positions within the truck bed and may be locked by a cotter-key or a padlock for security as the mounting means are brackets suitably mounted in proximity to both sidewalls of the bed. The barrier is made in the form of a membrane which can be wrapped around its support members to accommodate any width of truck bed and can be located forward or rearward of the wheel wells.

20 Claims, 2 Drawing Sheets

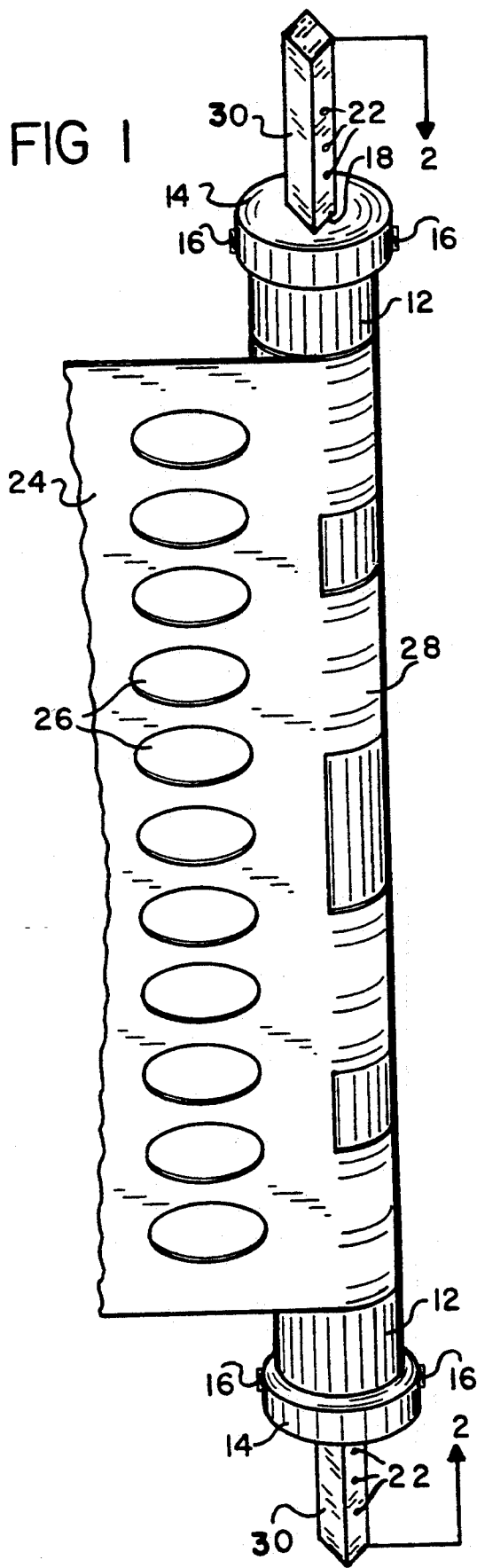
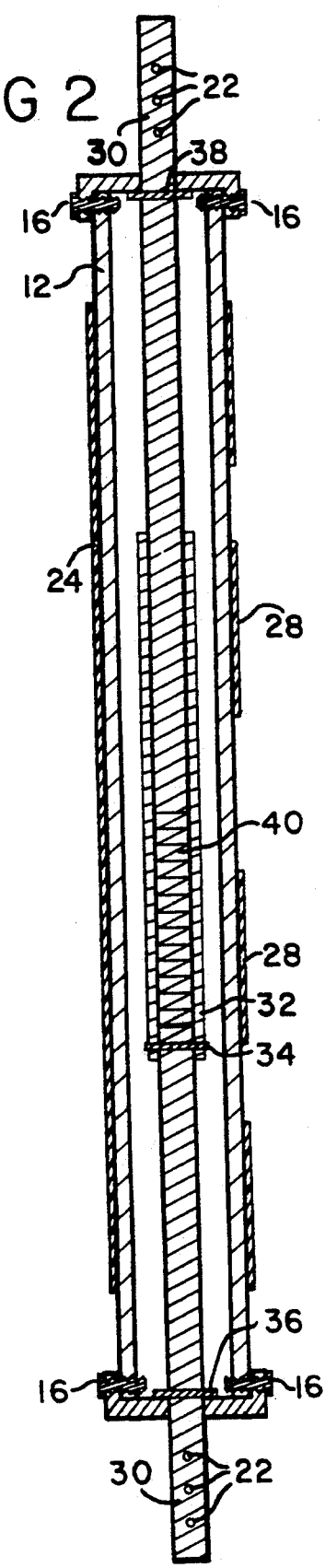

MULTI-POSITIONABLE, FLEXIBLE TAILGATE

FIELD OF THE INVENTION

This invention relates to tailgates for the bed of a pick-up truck and more particularly to a flexible net-like membrane which can be located in the bed of the truck in multiple forward or backward positions.

BACKGROUND OF THE INVENTION

Smaller trucks, such as light pickup and sport trucks, have an open bed with solid sides and a hinged solid metal tailgate. The tailgate is lowered for loading and unloading operations. An objective of this tailgate is to prevent persons and objects from falling off the rear of the truck bed. When the truck is running these tailgates exert a substantial parasitic aerodynamic drag. Their substantial weight and their parasitic drag combine to reduce the attainable speed of the vehicle especially of smaller trucks with less powerful engines, and decrease the attainable mileage per gallon of fuel.

The above disadvantages have long been widely recognized. In response, a market has developed in nets to replace the solid barriers. These can stop many or most articles and persons from falling out, and parasitic drag is greatly reduced or minimized. There are, however, shortcomings in the known nets which have led to higher prices, poor appearance, noisiness, and accelerated wear. Even so, a considerable demand exists for even these products because of the advantages they provide, especially their lesser weight and their lesser parasitic drag.

The existing tailgate nets suffer from several widely recognized problems. For example, they are not self-supporting in any way and rely on tension created by elastic inlays or the tensioning of individual horizontal webbing straps to try to create a flat tailgate shape. Without exception, these methods of tensioning produce very uneven results, such as bagging and sagging, as well as considerable high frequency flutter and flapping (with resulting noise) when the vehicle is in motion. The dynamic actions of these unbalanced systems further contribute to widely experienced tearing and rapid wear. The multiple individual attach points which are the characteristic feature of such nets are the only structural interconnection between strands that extend in one direction and strands that extend in another direction. Therefore, unless every strand is equally tensioned, there will necessarily be an out-of-plane sag or distortion. Even-ness of tensioning is most unlikely to be attained, and the consequence is a sloppy appearance, and the dynamic problems just described. In addition, these fabric nets have no hardpoints which can allow the attachment of an integral anti-theft device. The tailgate net has an industry-wide and consumer-wide reputation for quick and easy theft. All of these problems have been consistent and recognized from the inception of the product concept.

Also, the conventional tailgate net is located at the back-end of the truck bed as in a conventional taigate and no provision has been made to position the net in multiple forward positions.

The present invention addresses these and other inherent problems of the prior art.

SUMMARY OF THE INVENTION

It is therefore a primary object to provide a flexible pickup truck tailgate membrane that may be located at multiple positions forward or backward in the pickup bed.

It is a further object to provide a net which will be adjustable in its horizontal length to fit any width of pickup bed.

Still another object is to provide means to tension the net to avoid sag and deformity.

It is yet another object to provide suitable mounting brackets which may be installed in the pickup bed to accommodate the flexible membrane.

Yet another important object is to provide means to lock the net in place to discourage theft.

Yet another object is to provide a bushing or filler which may be used in conjunction with the bracket if required.

Other objects and advantages will become apparent when taken into consideration with the following specifications and drawings.

BRIEF DESCRIPTION OF THE DRAWINGS

FIG. 1, is a perspective view showing our new device with a flexible tailgate attached.

FIG. 2, is a sectional view taken at 2—2 of FIG. 1.

DETAILED DESCRIPTION OF THE DRAWINGS

Figure 3:
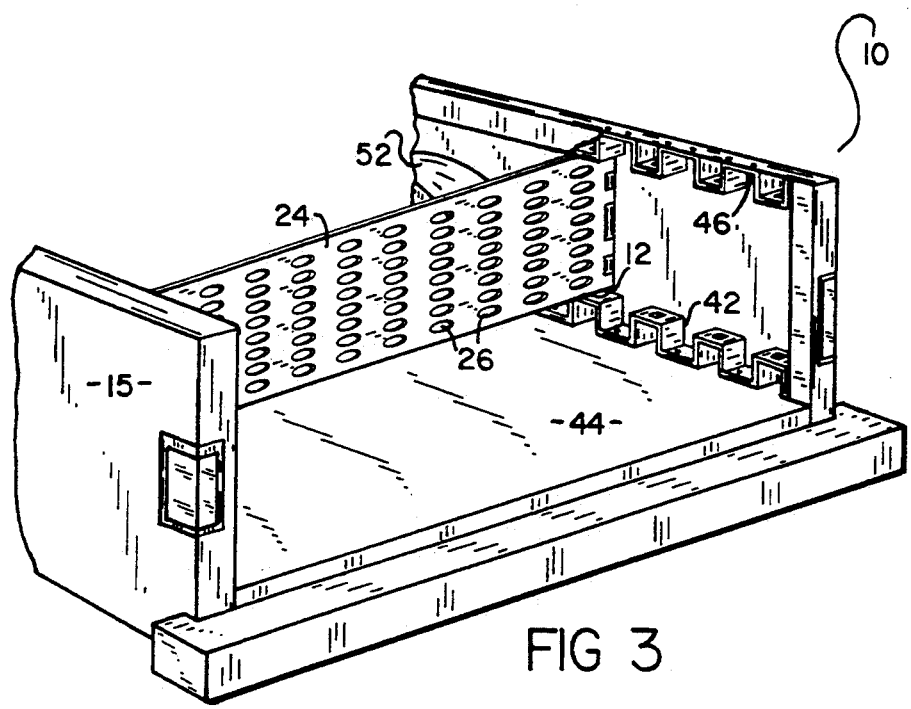
FIG. 3, is a perspective view showing the flexible tailgate when positioned within a truck bed.

Referring now in detail to the drawings wherein like characters refer to like elements throughout the various views, 10 as shown in FIG. 3, is an overview of the net 24 mounted in one location in a typical truck bed 15, while 12 as shown in FIG. 1, is a cylinder with end caps 14 secured to the cylinder 12 by suitable means such as screws 16 with the end caps 14 having a center, square opening 18 to accommodate square stock 20 and 30, which may be made of metal having multiple bores 22 to accommodate locking means such as a cotter-key (not shown) or a pad-lock (not shown). 24 is a net made from suitable material such as plastic and may have perforated openings 26 to allow air flow through the net to reduce drag. The net 24 may also be affixed or fastened to the cylinder 12 by loops such as 28 which allows the net 24 to be assembled on the cylinder 12 before the end caps 14 are affixed. The square stock 20 and 30, respectively, are of a size and shape to have a sliding relationship with square tubular member 32 with the square stock 30 being suitably affixed to member 32, such as by a pin 34 and is retained inside the cylinder 12 by pin 36, while square stock 20 is slidably engaged with tubular member 32 and is retained inside the cylinder 12 by pin 38. Square stock 20 and 30, respectively, are retained in a tensioned position away from each other by spring 40 which allows either 20 or 30 to be pushed inward for installation or removal.

Figure 4:
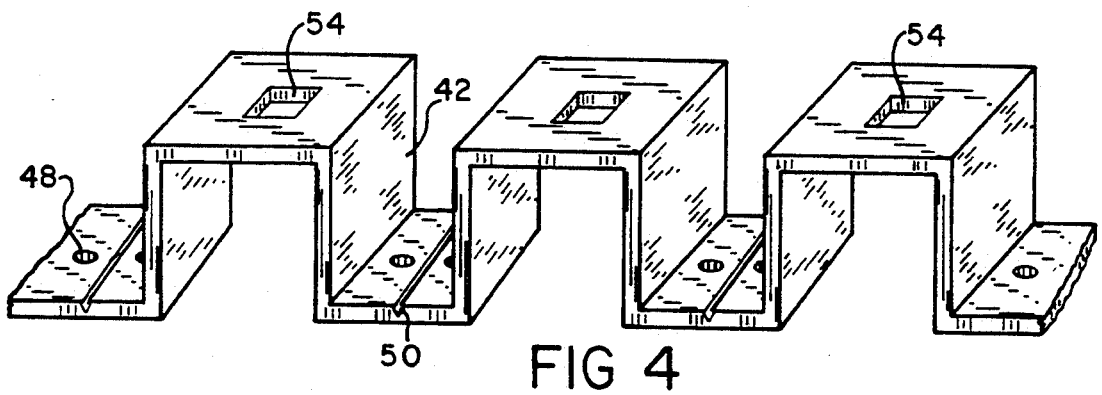
FIG. 4, is a perspective view of a bracket.
Figure 5:
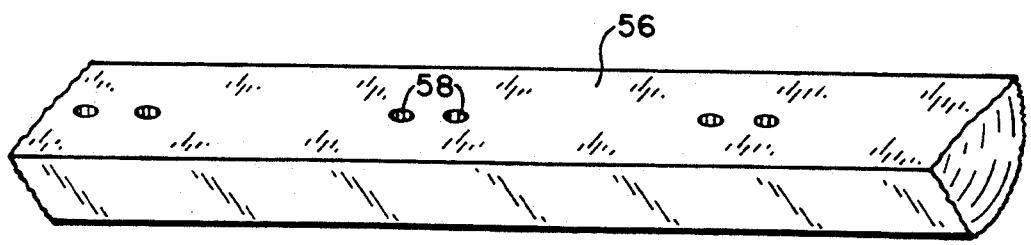
FIG. 5, is perspective view of a wedge-shaped filler strip.

In FIG. 4, a bracket 42 is disclosed which may be mounted on the floor 44 of truck bed 15 and under the upper lip 46 of truck bed 15 as shown by a cut-a-way view in FIG. 3. The bracket 42 is suitably mounted to the truck bed floor 44 and upper lip 46 thru typical holes 48, and the bracket 42 may be left intact as shown in FIG. 3, or may be separated at cut or shear lines 50 and used separately. The bracket 42 may also be mounted in front (not shown) of the wheel well 52 for placement of the net 24 in an even more forward position. Bracket 42 having square-hole slots 54 to receive the square stock 20 and 30, respectively, while in FIG. 5 shows a bushing or filler 56 which may be used if desired in conjunction with bracket 42 and may have a shape to conform to any curve on the panel of the pickup bed 15, (not shown), and has mating-mounting holes 58 to match mounting holes 48 of bracket 42.

It will now be seen that we have provided a tailgate net or membrane that may be installed in the bed of a pickup truck in multiple forward or rearward locations with the proper brackets of which only one embodiment is shown. When installing the net after the brackets have been affixed in the desired locations, one of the cylinders is placed in between the mounting brackets by depressing the two ends until they enter the square holes in the mounting bracket, and the square end members being spring loaded anchor the cylinder in the brackets. The net is then un-rolled until the opposite cylinder can be inserted in the opposite bracket and turned until a tensioned condition of the net is satisfactory and then the two ends are depressed and installed in the mounting bracket and the square end members being spring loaded anchor the cylinder in the brackets.

We have also provided means to secure the cylinder in the brackets by means of a cotter-key or lock for security purposes and we have also provided a bushing or filler which may be used if desired.

Also, we have provided a net which is variable in its length to accommodate any width of truck bed.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A tailgate barrier to be suspended between the sidewalls of an open bed of a truck comprising; a flexible membrane, said membrane having a top edge, a bottom edge and two side edges, said membrane being longer in its length than in its width, said membrane having a plurality of openings therethrough between said edges, at least two substantially rigid mounting members, being at least as long in length as the width of said membrane, means to attach said membrane at its two ends to said mounting members, said membrane being made of a material capable of being wrapped around said mounting members, means to vertically support said mounting members at each of their ends in close proximity to said sidewalls of said bed of said truck, and said means to vertically support said mounting members being capable of being mounted at multiple locations along said sidewalls.

2. The tailgate barrier of claim 1 in which said length of said membrane is at least as long as the widest commercially available pickup truck bed.

3. The tailgate barrier of claim 1 in which said mounting members are cylinders.

4. The tailgate barrier of claim 3 in which said cylinders have end caps, said caps having a square hole located substantially in their centers to accept a square shaft and means to attach said end caps to said cylinders.

5. The tailgate barrier of claim 4 in which said shaft has a first and second section, a square tubular section, said first and second section being of a size an shape to enter said square tubular section, means to affix said first section within one end of said square tubular section, said second section having a sliding relationship with said tubular section, a compression spring, said spring being of a size and shape to enter said tubular section, said spring to be located between said first and second sections, means to limit the travel of said first and second sections within said mounting members,
whereby,
said spring exerts an outward tension on said first and second sections.

6. The tailgate barrier of claim 5 in which said means to affix said first section within one end of said square tubular section is a pin.

7. The tailgate barrier of claim 5 in which said means to limit the travel of said first and second sections are pins, said pins being of a longer length than the width of said square section.

8. The tailgate barrier of claim 5 in which said first and second sections of said square shaft has at least one traverse bore, said bore being located at the distal outer ends of said sections, said bore being of a size to accept a cotter-key.

9. The tailgate barrier of claim 8 in which said bore is of a size to accept a padlock.

10. The tailgate barrier of claim 1 in which said means to mount said membrane to said mounting members are multiple loops, said loops being on the ends of said membrane, said loops being of a size and shape to surround and capture said mounting member.

11. The tailgate barrier of claim 1 in which said means to vertically support said mounting members at each of their ends in close proximity to said sidewalls of said bed of said truck are brackets, said brackets having mounting means to mount said brackets to said truck bed, said brackets cooperating with said mounting members to capture and hold said mounting members.

12. The tailgate barrier of claim 11 in which said brackets are substantially U-shaped, means to mount said brackets to said bed of said truck, said brackets having a traverse square hole located substantially in the center of the common leg of said U-shaped brackets, said traverse square hole cooperating with a square protrusion on the ends of said mounting members.

13. The tailgate barrier of claim 12 in which said mounting means to mount said brackets to said bed of said truck are bolts.

14. The tailgate barrier of claim 12 in which said brackets are formed in the shape of multiple opposing attached U's, said U's having an upper and lower row of common legs, said upper row of common legs having traverse square holes located substantially in their centers, said lower row of common legs having at least two traverse bores, said lower row of common legs having a shear indentation line, said indentation line being located substantially traversely across the center section of said lower row of common legs, said indentation separating said traverse bore holes.

15. The tailgate barrier of claim 4 in which said means to attach said end caps to said cylinders are by screws.

16. The tailgate barrier of claim 11 including a filler strip, said strip having mounting means cooperating with said mounting means to mount said brackets to said truck bed, said filler strip being made of a size and shape to conform to the floor and said sidewalls of said pickup truck.

17. The tailgate barrier of claim 16 in which said filler strip is made of wood.

18. The tailgate barrier of claim 1 in which said membrane is made of plastic.

19. The tailgate barrier of claim 1 in which said mounting members are made of metal.

20. The tailgate barrier of claim 11 in which said brackets are made of metal.

* * * * *